United States Patent
Lin et al.

(10) Patent No.: US 9,065,289 B2
(45) Date of Patent: Jun. 23, 2015

(54) ACTIVATE CIRCUIT AND ELECTRONIC DEVICE

(71) Applicant: Wistron Corporation, New Taipei (TW)

(72) Inventors: Jia-He Lin, New Taipei (TW); Chun-Ta Lee, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 174 days.

(21) Appl. No.: 14/019,549

(22) Filed: Sep. 6, 2013

(65) Prior Publication Data
US 2015/0028820 A1 Jan. 29, 2015

(30) Foreign Application Priority Data
Jul. 24, 2013 (TW) .............................. 102126516 A

(51) Int. Cl.
*H02J 7/00* (2006.01)
(52) U.S. Cl.
CPC .................................... *H02J 7/0052* (2013.01)
(58) Field of Classification Search
CPC ....................................................... H02J 7/345
USPC .......................................................... 320/166
See application file for complete search history.

(56) References Cited

U.S. PATENT DOCUMENTS

| | | | | |
|---|---|---|---|---|
| 5,493,203 A | * | 2/1996 | Dalton | 323/282 |
| 5,539,298 A | * | 7/1996 | Perkins et al. | 320/139 |
| 5,778,239 A | * | 7/1998 | Cox | 713/340 |
| 8,390,433 B2 | | 3/2013 | Warner | |
| 2007/0278861 A1 | * | 12/2007 | Lou et al. | 307/66 |
| 2008/0104433 A1 | * | 5/2008 | May et al. | 713/300 |
| 2014/0139187 A1 | * | 5/2014 | Peng et al. | 320/134 |

* cited by examiner

*Primary Examiner* — Suresh Memula
(74) *Attorney, Agent, or Firm* — Winston Hsu; Scott Margo

(57) ABSTRACT

An activate circuit for an electronic device includes a first node, a first transistor including a source coupled to a ground, a drain coupled to the first node, and a gate coupled to a battery voltage, a first diode including an anode coupled to an activate signal, and a cathode a first resistance coupled between the cathode of the first diode and the first node, a capacitor coupled between the first node and the ground having a logic low level, and a second transistor including a source coupled to the ground, a drain coupled to the activate signal, and a gate coupled to the first node.

16 Claims, 3 Drawing Sheets

ACTIVATE CIRCUIT AND ELECTRONIC DEVICE

BACKGROUND OF THE INVENTION

1. Field of the Invention

The invention relates to an activate circuit and electronic device, and more particularly to an activate circuit and electronic device for properly turning on the electronic device when a real-time clock battery is dead or damaged.

2. Description of the Prior Art

An electronic device having a built-in or replaceable battery module, such as a laptop, a tablet PC or a mobile phone, may be powered by the built-in battery module and charged by an external power supply. A user may simply press a power button to turn on the electronic device when the battery module is charged or the electronic is connected to the external power supply.

The battery module is commonly designed with a specific output pin, named presence pin, for outputting an activate signal to activate the battery module. In general, the battery module is turned off when the activate signal is at a logic high level; and the battery module is activated to power the electronic device when the activate signal is at a logic low level. In addition, a real-time clock (hereafter called RTC) battery may be disposed in the electronic device to be a temporary power supply of the power button, such that the battery module can be activated when the electronic device is not connected to the external power supply.

However, under a circumstance that the RTC battery is dead or damaged and the electronic device is not connected to the external power supply, the battery module can not be activated to turn on the power of the electronic device, which brings inconvenience to the user and may mislead the user into believing that the electronic device is broken.

Therefore, there is a need to design an activate circuit which enables the user to turn on the electronic device when the RTC battery is dead or damaged.

SUMMARY OF THE INVENTION

It is therefore an objective of the invention to provide an activate circuit and electronic device for properly turning on the electronic device when the RTC battery is dead or damaged.

An embodiment of the invention discloses an activate circuit, for an electronic device, comprising a first node, a first transistor including a source coupled to a ground, a drain coupled to the first node, and a gate coupled to a battery voltage, a first diode including an anode coupled to an activate signal, and a cathode, a first resistance coupled between the cathode of the first diode and the first node, a capacitor coupled between the first node and the ground having a logic low level, and a second transistor including a source coupled to the ground, a drain coupled to the activate signal, and a gate coupled to the first node.

An embodiment of the invention further discloses an electronic device, comprising a battery module, and an activate circuit coupled to the battery module and comprising a first node, a first transistor including a source coupled to a ground, a drain coupled to the first node, and a gate coupled to a battery voltage, a first diode including an anode coupled to an activate signal, and a cathode, a first resistance coupled between the cathode of the first diode and the first node, a capacitor coupled between the first node and the ground having a logic low level, and a second transistor including a source coupled to the ground, a drain coupled to the activate signal, and a gate coupled to the first node.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
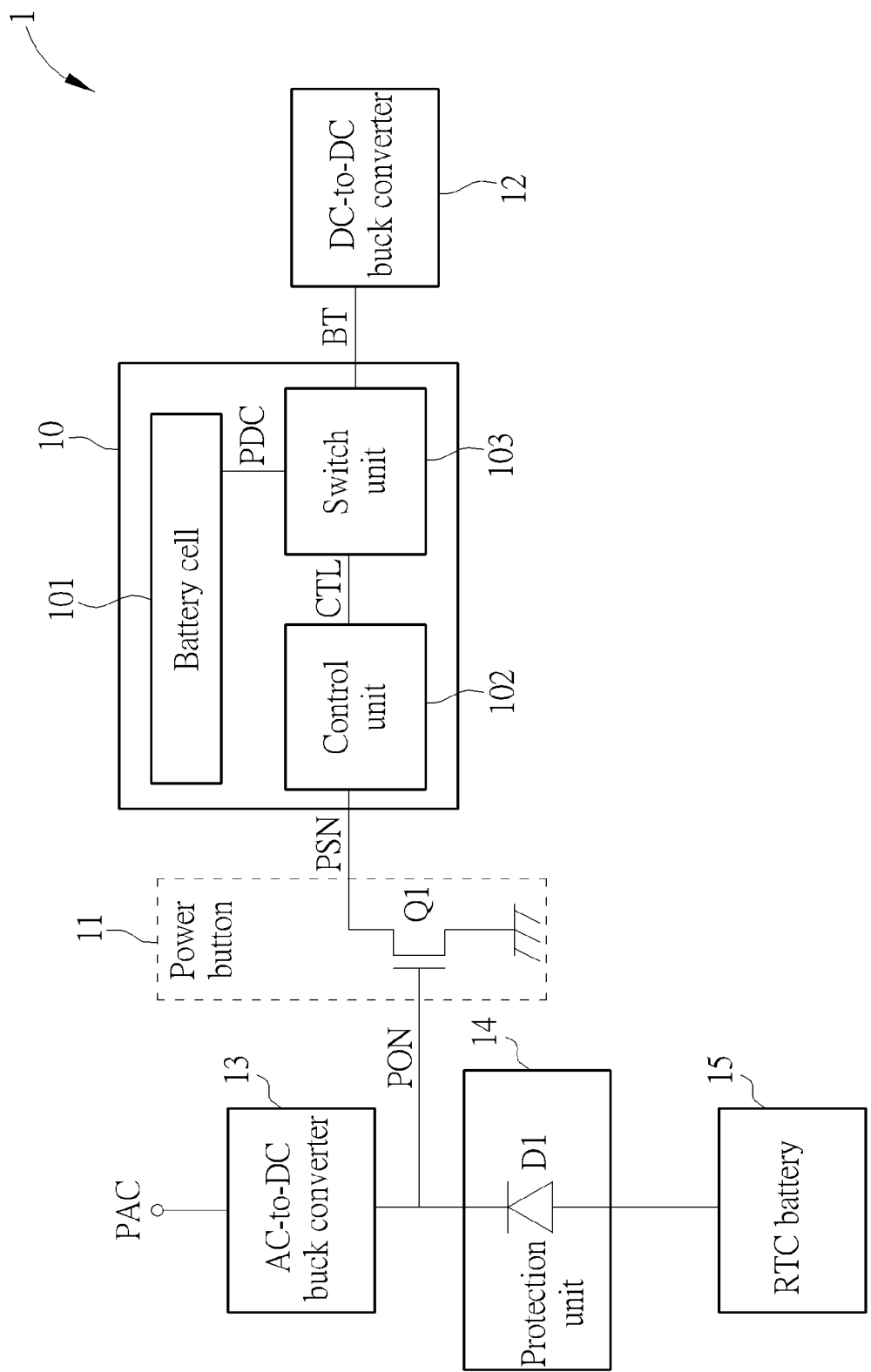
FIG. 1 is a schematic diagram of an electronic device.

Please refer to FIG. 1 for describing how an electronic device is turned on, FIG. 1 is a schematic diagram of an electronic device 1. The electronic device 1 includes a battery module 10, a power button 11, power converters 12 and 13, a protection unit 14 and a RTC battery 15. The power converter 13 is preferably an AC-to-DC buck converter for converting an AC (alternating-current) voltage PAC into a DC (direct current) voltage PON. The power button 11 is coupled between the power converter 13 and the battery module 10, a switching state of the power button 11 may be controlled according to the DC voltage PON to adjust an activate signal PSN. The battery module 10 includes at least one battery cell 101, a control unit 102 and a switch unit 103. The battery cell 101 is used for providing a DC voltage PDC. The control unit 102 is used for generating a control signal CTL according to the activate signal PSN. The switch unit 103 is coupled between the control unit 102 and the battery cell 101 for generating an output signal BT to the power converter 12 according to the control signal CTL and the DC voltage PDC. The power converter 12 is coupled to the battery module 10, and preferably a DC-to-DC buck converter for converting the DC voltage PDC provided by the battery cell 101 into voltages having different voltage levels to respectively supply powers to inner circuits of the electronic device 1. The protection unit 14 is coupled to the RTC battery 15, which is preferably realized by a diode D1 to prevent a direct current from flowing into the RTC battery 15 and protect the RTC battery 15.

Noticeably, the activate signal PSN is used for activating the battery module 10. Under a normal circumstance, the battery module 10 is turned off when the activate signal PSN is at a logic high level; while the battery module 10 is activated and turned on once the activate signal PSN is pulled low to a logic low level, to supply voltages to the electronic device 1.

Specifically, the power button 11 may be realized by a transistor Q1. The transistor Q1 includes a source coupled to a ground, a drain coupled to the activate signal PSN, and a gate coupled to the power converter 13 to receive the DC voltage PON. The ground has a logic low level. When the electronic device 1 is connected to an external power supply, the DC voltage PON may be generated by the power converter 13 to control a switching state of the transistor Q1. When the transistor Q1 is turned on by the DC voltage PON, the activate signal PSN may be pulled low to the logic low level, i.e. short with the ground, such that the battery module 10 is activated to perform charging. On the other hand, when the electronic device 1 is not connected to the external power supply, the DC voltage PON is generated by the RTC battery 15 to drive the power button 11 to turn on the transistor Q1, such that the activate signal PSN is able to be pulled low to the logic low level, and thus the battery module 10 is activated to supply power to the electronic device 1.

However, in such a structure of the electronic device 1, the battery module 10 may not be activated when the RTC battery 15 is dead or damaged and the electronic device 1 is not connected to the external power supply.

Figure 2:
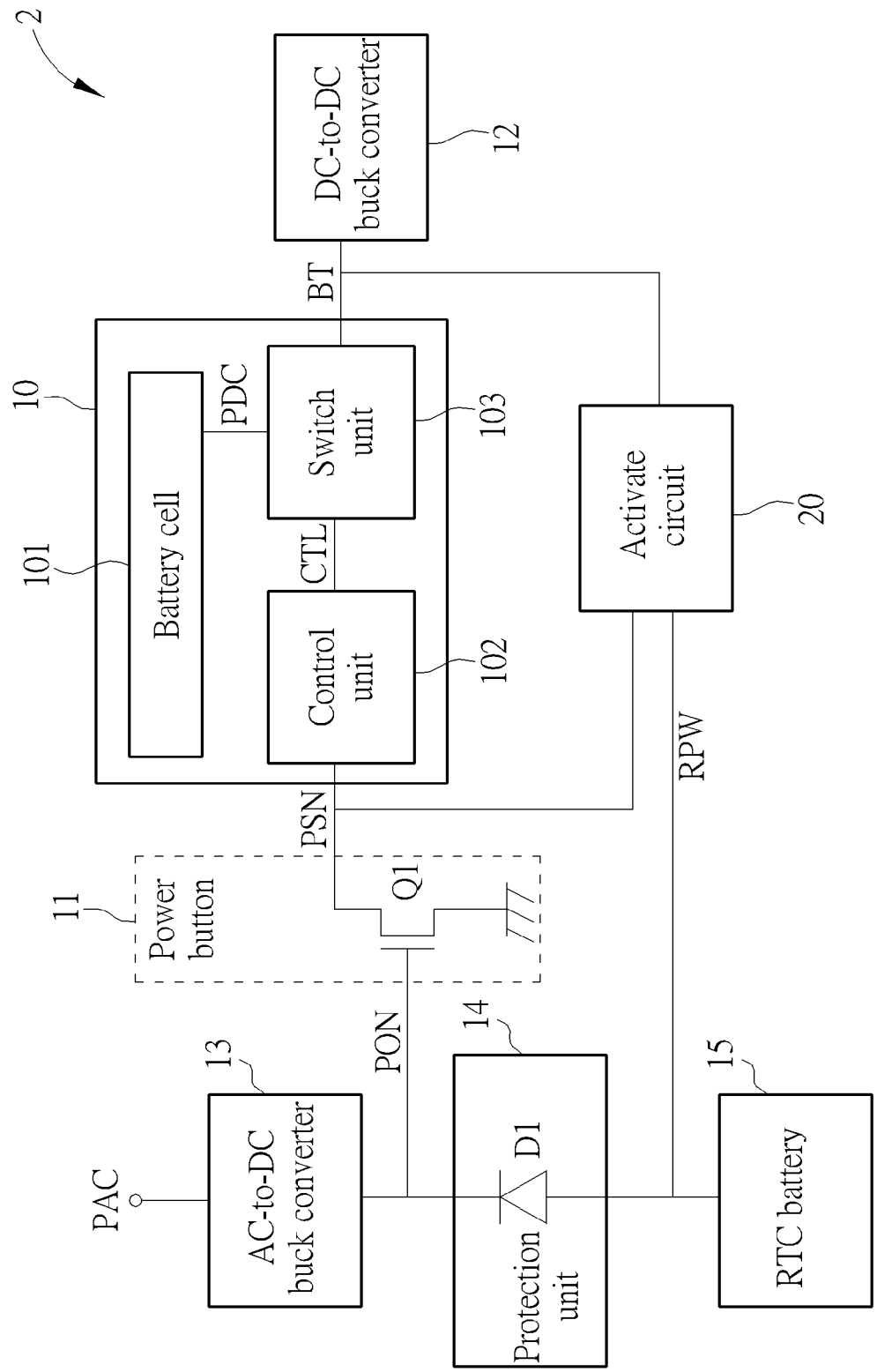
FIG. 2 is a schematic diagram of an electronic device according to an embodiment of the invention.

To solve the above mentioned problem, please refer to FIG. 2, which is a schematic diagram of an electronic device 2 according to an embodiment of the invention. A difference between the electronic devices 1 and 2 is that the electronic device 2 further includes an activate circuit 20. The activate circuit 20 is coupled to the battery module 10 and the RTC battery 15 for activating the battery module 10 when the RTC battery 15 is dead or damaged. The activate circuit 20 may adjust the activate signal PSN according to a battery voltage RPW of the RTC battery 15 to pull the activate signal PSN to the logic low level, so as to activate the battery module 10. Meanwhile, the activate circuit 20 may generate a warning light according to the battery voltage RPW and the output signal BT to notify the user that the RTC battery 15 is dead or damaged.

Figure 3:
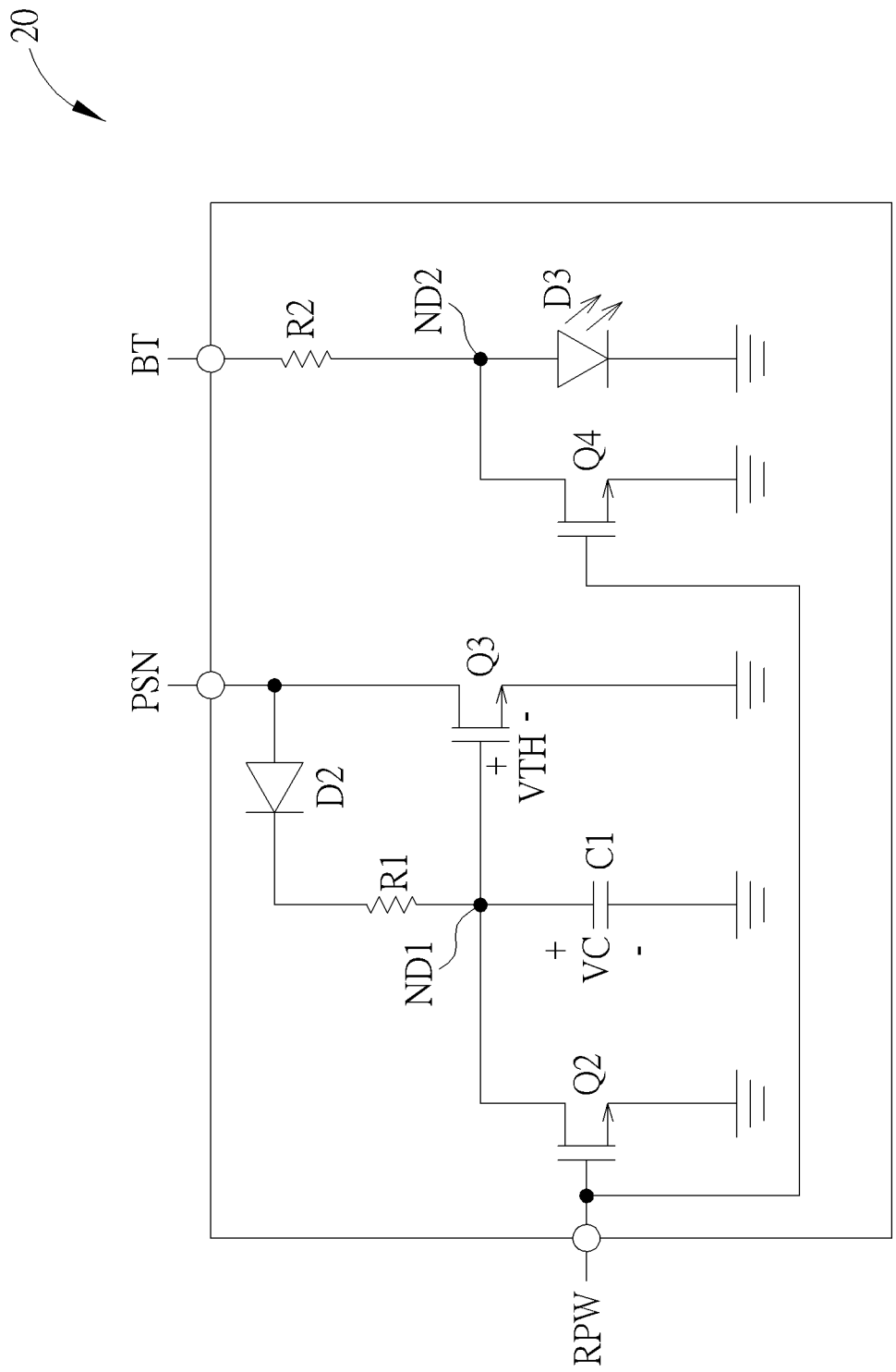
FIG. 3 is a circuitry diagram of the activate circuit shown in FIG. 2 according to an embodiment of the invention.

In detail, please refer to FIG. 3, which is a circuitry diagram of the activate circuit 20 according to an embodiment of the invention. The activate circuit 20 includes transistors Q2, Q3 and Q4, resistors R1 and R2, diodes D2 and D3 and a capacitor C1. As shown in FIG. 3, a node ND1 is denoted between the transistors Q2 and Q3, the resistor R1 and the capacitor C1, and a node ND2 is denoted between the transistor Q4, the resistor R2 and the diode D3 for illustrative convenience. The transistor Q2 includes a source coupled to the ground, a drain coupled to node ND1, and a gate coupled to the battery voltage RPW. The resistor R1 is coupled between a cathode of the diode D2 and the node ND1, and an anode of the diode D2 is coupled to the activate signal PSN. The capacitor C1 is coupled between the node ND1 and the ground. The transistor Q3 includes a source coupled to ground, a drain coupled to the activate signal PSN, and a gate coupled to node ND1.

The transistor Q4 includes a source coupled to the ground, a drain coupled to the node ND2, and a gate coupled to the battery voltage RPW. The resistor R2 is coupled between the output signal BT and the node ND2. The diode D3 includes an anode coupled to the node ND2, and a cathode coupled to the ground. The diode D3 is preferably a light-emitting diode for generating the warning light when the RTC battery 15 is dead or damaged.

Under a circumstance that the RTC battery 15 normally supplies power, the transistor Q1 and the transistors Q2 and Q4 of the activate circuit 20 are turned on by the battery voltage RPW. Once the transistor Q1 is turned on, the activate signal PSN of the battery module 10 is pulled low to the logic low level, such that the battery module 10 generates the output signal BT to the power converter 12. The power converter 12 may convert the DC voltage PDC provided by the battery cell 101 into voltages having different voltage levels according to the output signal BT to respectively supply powers to inner circuits of the electronic device 2. When the transistor Q2 is turned on, the transistor Q3 is turned off, and thus the voltage level of the activate signal PSN is not influenced by the activate circuit 20, and the activate circuit 20 is turned off. In addition, the anode and the cathode of the diode D3 are coupled to the ground when the transistor Q4 is turned on, thereby the diode D3 is turned off and does not emit the warning light.

On the other hand, under a circumstance that the RTC battery 15 is dead or damaged and the electronic device 2 is not connected to the external power supply, the transistor Q1 and the transistors Q2 and Q4 of the activate circuit 20 are turned off. The activate signal PSN of the battery module 10 is floating to remain at the logic high level when the transistor Q1 is turned off. A voltage level of the activate signal PSN is substantially greater than a turned-on voltage, approximately 0.7 volts, of the diode D2 to turn on the diode D2, thereby a current is generated on the resistor R1. Afterwards, the activate signal PSN may charge the capacitor C1, such that a cross voltage VC may be generated on the capacitor C1. The transistor Q3 may be turned on once the cross voltage VC of the capacitor C1 exceeds a threshold voltage VTH of the transistor Q3, such that the activate signal PSN may be pulled to the logic low level. As a result, the activate circuit 20 may pull the activate signal PSN to the logic low level when the RTC battery 15 is dead or damaged, so as to activate the battery module 10 to generate the output signal BT to the power converter 12, which enables the user to turn on the power of the electronic device.

Further more, the transistor Q4 is turned off when the battery voltage RPW of the RTC battery 15 is substantially equal to the logic low level, or when the battery voltage RPW is less than a threshold voltage of the transistor Q4. In addition, the battery module 10 may generate the output signal BT to turn on the diode D3 after the activate signal PSN is pulled to the logic low level. In such a situation, the diode D3 may be turned on to emit the warning light, which informs the user that the RTC battery 15 is dead or damaged and a replacement or repair of the RTC battery is required.

As can be seen, by disposing the activate circuit 20, the activate signal PSN of the battery module 10 may be pulled from the logic high level to the logic low level under that circumstance that the RTC battery 15 is dead or damaged and the electronic device 2 is not connected to the external power supply, such that the battery module 10 may be activated to provide power to the inner circuits of the electronic device 2. In short, the electronic device 2 may be turned on under the circumstance that the RTC battery 15 is dead or damaged and the electronic device 2 is not connected to the external power supply.

Please note that the circuitry diagram shown in FIG. 3 is one of embodiments of the activate circuit 20, those skilled in the art may make modifications and alterations accordingly, which is not limited. For example, during a moment that the user presses the power button 11, the current flowing on the resistor R1 and generated by the activate signal PSN shall charge the capacitor C1 and pull the cross voltage VC of the capacitor C1 higher than the threshold voltage VTH of the transistor Q3, so as to activate the battery module 10. Therefore, a resistance of the resistor R1 and a capacitance of the capacitor C1 shall be properly selected and adjusted according to the voltage level of the activate signal PSN. On the other hand, a resistance of the resistor R2 shall be selected according to the voltage level of the output signal BT. In other words, a voltage that the output signal BT minus a cross voltage on the resistor R2 shall be greater than the turned-on voltage of the diode D3, so as to generate the warning light. Besides, the diode D3 may be replaced by other elements such a buzzer for generating a warning sound to notify the user that the RTC battery 15 is dead or damaged.

To sum up, the activate circuit of the invention may pull the activate signal of the battery module from the logic high level to the logic low level under the circumstance that the RTC battery is dead or damaged and the electronic device is not connected to the external power supply, which activates the battery module to provide power to the inner circuits of the electronic device. As a result, the user may turn on the electronic device when the RTC battery is dead or damaged. In addition, the activate circuit may generate the warning light to inform the user that the RTC battery is dead or damaged and a replacement or repair of the RTC battery is required.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An activate circuit, for an electronic device, comprising:
   a first node;
   a first transistor including a source coupled to a ground, a drain coupled to the first node, and a gate coupled to a battery voltage;
   a first diode including an anode coupled to an activate signal, and a cathode;
   a first resistance coupled between the cathode of the first diode and the first node;
   a capacitor coupled between the first node and the ground having a logic low level; and
   a second transistor including a source coupled to the ground, a drain coupled to the activate signal, and a gate coupled to the first node.

2. The activate circuit of claim 1, wherein the activate signal charges the capacitor when the battery voltage is substantially equal to the logic low level, such that a cross voltage is generated on the capacitor.

3. The activate circuit of claim 2, wherein the second transistor is turned on when the cross voltage of the capacitor is greater than a threshold voltage of the second transistor, such that the activate signal is pulled low to the logic low level.

4. The activate circuit of claim 1, further comprising:
   a second node;
   a third transistor including a source coupled to the ground, a drain coupled to the second node, and a gate coupled to the battery voltage;
   a second resistance coupled between an output signal and the second node between; and
   a second diode including an anode coupled to the second node, and a cathode coupled to the ground.

5. The activate circuit of claim 4, wherein the electronic device comprises a battery module, the activate circuit is used for activating the battery module, and the battery module comprises:
   at least one battery cell for providing a DC (direct-current) voltage;
   a control unit for outputting the battery voltage to the activate circuit, and outputting a control signal; and
   a switch unit coupled between the at least one battery cell and the control unit and for generating the output signal according to the control signal and the DC voltage.

6. The activate circuit of claim 4, wherein the third transistor is turned off when the battery voltage is substantially equal to the logic low level, such that the output signal turns on the second diode.

7. The activate circuit of claim 4, wherein the second diode is a light-emitting diode.

8. The activate circuit of claim 1, wherein the electronic device comprises:
   a fourth transistor including a source coupled to the ground, a drain coupled to the activate signal, and a gate coupled to a power converter, to receive a DC voltage; and
   a third diode including an anode coupled to a real-time clock (RTC) battery for generating the battery voltage, and a cathode coupled to the gate of the fourth transistor.

9. An electronic device, comprising:
   a battery module; and
   an activate circuit coupled to the battery module and comprising:
   a first node;
   a first transistor including a source coupled to a ground, a drain coupled to the first node, and a gate coupled to a battery voltage;
   a first diode including an anode coupled to an activate signal, and a cathode;
   a first resistance coupled between the cathode of the first diode and the first node;
   a capacitor coupled between the first node and the ground having a logic low level; and
   a second transistor including a source coupled to the ground, a drain coupled to the activate signal, and a gate coupled to the first node.

10. The electronic device of claim 9, wherein the activate signal charges the capacitor when the battery voltage is substantially equal to the logic low level, such that a cross voltage is generated on the capacitor.

11. The electronic device of claim 10, wherein the second transistor is turned on when the cross voltage of the capacitor is greater than a threshold voltage of the second transistor, such that the activate signal is pulled low to the logic low level.

12. The electronic device of claim 9, wherein the activate circuit further comprises:
    a second node;
    a third transistor including a source coupled to the ground, a drain coupled to the second node, and a gate coupled to the battery voltage;
    a second resistance coupled between an output signal and the second node between; and
    a second diode including an anode coupled to the second node, and a cathode coupled to the ground.

13. The electronic device of claim 12, wherein the electronic device comprises a battery module, the activate circuit is used for activating the battery module, and the battery module comprises:
    at least one battery cell for providing a DC (direct-current) voltage;
    a control unit for outputting the battery voltage to the activate circuit, and outputting a control signal; and
    a switch unit coupled between the at least one battery cell and the control unit and for generating the output signal according to the control signal and the DC voltage.

14. The electronic device of claim 12, wherein the third transistor is turned off when the battery voltage is substantially equal to the logic low level, such that the output signal turns on the second diode.

15. The electronic device of claim 12, wherein the second diode is a light-emitting diode.

16. The electronic device of claim 9, further comprising:
    a fourth transistor including a source coupled to the ground, a drain coupled to the activate signal, and a gate coupled to a power converter, to receive a DC voltage; and
    a third diode including an anode coupled to a RTC (real-time clock) battery for generating the battery voltage, and a cathode coupled to the gate of the fourth transistor.

* * * * *